3,459,765
CHRYSENO[5,6-d]IMIDAZOLES AND PROCESS FOR THEIR MANUFACTURE
Adrian Marxer, Muttenz, Switzerland, assignor to Ciba Corporation, New York, N.Y., a corporation of Delaware
No Drawing. Filed Oct. 11, 1965, Ser. No. 494,958
Claims priority, application Switzerland, Oct. 13, 1964, 13,302/64
Int. Cl. C07d 49/36; A61k 27/00
U.S. Cl. 260—309.2                                                15 Claims

ABSTRACT OF THE DISCLOSURE

Process for the manufacture of chryseno[5,6-d]imidazoles in free form or in the form of an acid addition salt thereof, wherein a 5:6-chrysenequinone is reacted with formaldehyde and ammonia; and the products obtained thereby, useful as tumour inhibitors.

---

The present invention provides a process for the manufacture of chryseno[5,6-d]imidazoles.

It is known that phenanthro[9,10-d]imidazoles are obtained by reacting a 9:10-phenanthrenequinone with ammonia or a salt thereof, for example ammonium acetate, and an aldehyde, for example an aromatic aldehyde (cf. French specification No. 1,271,986 granted to Gevaert Photo-Producten N.V., Belgium, published Aug. 16, 1961, and E. A. Steck and A. R. Day, J. Amer. Chem. Soc. 65, page 452 [1943]).

However, as has been shown in the afore-mentioned French specification, an analogous reaction of 5:6-chrysenequinone with aromatic aldehydes and ammonium salts does not lead to the corresponding chryseneimidazoles but to the 2-arylchryseno[6,5-d]oxazoles.

It is therefore surprising that chryseno[5,6-d]imidazoles are obtained when formaldehyde is used as aldehyde.

Accordingly, the present invention provides a process for the manufacture of chryseno[5,6-d]imidazoles, wherein a 5:6-chrysenequinone is reacted with formaldehyde and ammonia.

The 5:6-chrysenequinones to be used as starting materials may be unsubstituted or may contain one, two or more substituents. Particularly suitable relevant substituents are lower alkyl groups, lower alkoxy groups, hydroxyl groups, halogen atoms or nitro groups.

Lower alkyl groups are above all methyl, ethyl, propyl, isopropyl, butyl, pentyl or hexyl radicals. Lower alkoxy radicals are above all methoxy, ethoxy, propoxy or butoxy radicals, and as halogen atoms there may be mentioned primarily chlorine or bromine atoms.

As examples of such chrysenequinones there may be mentioned: 12-bromo-5:6-chrysenequinone, 12-chloro-5:6 - chrysenequinone, 11 - chloro - 2:3 - dimethyl - 5:6-chrysenequinone, dichloro - 5:6 - chrysenequinone, dibromo - 5:6 - chrysenequinone, 12 - hydroxy - 5:6 - chrysenequinone, 1:4 - dihydroxy - 5:6 - chrysenequinone, 7:10 - dihydroxy - 5:6 - chrysenequinone, 12 - nitro - 5:6-chrysenequinone, dinitro - 5:6 - chrysenequinone, 12-ethyl - 5:6-chrysenequinone and 12 - benzyl - 5:6 - chrysenequinone.

Formaldehyde may also be used in the form of a formaldehyde donor, such as paraformaldehyde, trioxymethylene or urotropine. Formaldehyde is advantageously used in a molecular ratio or in a slight excess, for example 1.5 to 2.6 mols of every mol of chrysenequinone.

Ammonia is advantageously used in the form of one of its salts, for example a lower alkanoate such as the formate or acetate. It is advantageous to use more than 4 mols of ammonia or ammonium salt, preferably about 6 to 20 mols, for every mol of chrysenequinone.

The reaction can be performed, for example, in a solvent, above all in an organic solvent such as a lower alkanoic acid, such as formic or acetic acid. It is of advantage to perform the reaction at an elevated temperature, if desired or required under superatmospheric pressure.

According to a particularly advantageous method a 5,6-chrysenequinone is reacted with formaldehyde and an excess of an ammonium lower alkanoate, especially ammonium acetate, in a lower alkanoic acid, above all in glacial acetic acid, at an elevated temperature.

Depending on the reaction conditions and starting materials used the final products are obtained in the free form or in the form of their salts which are likewise included in the present invention. The salts undergo relatively easily dissociation in an aqueous solution, so that the new compounds are preferably used in the free form. The salts can be converted into the free bases in the known manner, for example with alkalies or ion-exchange resins. On reaction with strong organic or inorganic acids, especially those which are capable of forming therapeutically acceptable salts, they yield salts. As such acids there may be mentioned, for example: hydrohalic acids, sulfuric acids, phosphoric acids, nitric and perchloric acid; aliphatic, alicyclic, aromatic or heterocyclic sulfonic acids or strong carboxylic acids, such as chloracetic, tartaric, citric, methanesulfonic, ethanesulfonic, hydroxyethanesulfonic, ethylenesulfonic acid; halobenzenesulfonic, toluenesulfonic, naphthalenesulfonic acids or sulphanilic acid.

These or other salts of the new compounds, for example their picrates, may also be used for purifying the free bases by converting them into their salts, isolating the latter and liberating the bases again from them. In view of the close relationship between the new compounds in the free form and in the form of their salts what has been said above and below with reference to the free bases applies also to the corresponding salts whenever this is possible and appropriate.

The invention further includes any variant of the present process in which an intermediate obtainable at any stage of the process is used as starting material and any remaining step/steps is/are carried out or the process is discontinued at any stage thereof, or in which the starting materials are formed in situ or the reactants may be in the form of their salts.

The starting materials are known or can be prepared by known methods.

The new chryseno[5,6-d]-imidazoles possess valuable pharmacological properties, above all they inhibit tumours. Thus, for example, in the rat they inhibit transplanted tumours such as Walker Carcino-Sarcoma 256, and the growth of spontaneous tumours, for example the growth of the mammary tumours in the mouse. The new compounds may therefore be used as tumour-inhibiting medicaments.

They may also be used as intermediates in the manufacture of other valuable compounds.

A particularly valuable tumour-inhibiting effect is observed with chryseno[5,6-d]imidazole.

The new compounds can be used, for example, in the form of pharmaceutical preparations containing them in the free form or in the form of their physiologically tolerable salts, in conjunction or admixture with an organic or inorganic, solid or liquid pharmaceutical excipient suitable for enteral, parenteral or local administration. Suitable excipients are substances that do not react with the new compounds, for example, water, gelatin, lactose, starches, stearyl alcohol, magnesium, stearate, talcum, vegetable oils, benzyl alcohols, gums, polyalkyleneglycols, white petroleum jelly, or other known medicinal excipients. The pharmaceutical preparations may be, for example, tablets, dragees, capsules, ointments or creams, or in liquid form solutions, suspensions or emulsions. They may be sterilized and/or contain assistants, such as preserving, stabilizing, wetting or emulsifying agents, solution promoters, salts for regulating the osmotic pressure or buffers. They may also contain other therapeutically valuable substances. The preparations are formulated in the known manner.

The following examples illustrate the invention.

EXAMPLE 1

A solution of 32.0 g. of ammonium acetate in 200 ml. of boiling glacial acetic acid is mixed with 10 ml. of formaldehyde solution of 40% strength. This mixture is rapidly mixed with a solution of 13.0 g. of 5:6-chrysenequinone in 600 ml. of glacial acetic acid and refluxed for one hour. After about 5 minutes the red solution turns yellow. The batch is evaporated to about half its volume under vacuum and the incipient crystallization is completed by adding ½ liter of water. The brown-yellow precipitate is isolated and recrystallized from alcohol, to yield chryseno-[5,6-d]-imidazole of the formula

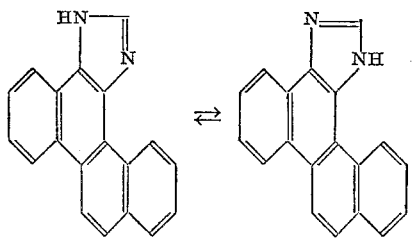

melting at 221 to 223° C. Nitrogen content: calculated 10.44%, found 10.53%.

The hydrochloride of this compound, prepared in alcohol, melts at 320 to 321° C.

EXAMPLE 2

A solution of 32.0 g. of ammonium acetate in 200 ml. of boiling glacial acetic acid is mixed with 10 ml. of formaldehyde solution of 40% strength, and a suspension of 15.2 g. of 12-nitro-5:6-chrysenequinone in 600 ml. of glacial acetic acid is added. The whole is refluxed for 2 hours at the boil—whereupon a bright solution forms—and then allowed to cool, whereupon much of the material crystallizes out. The crystallizate is isolated and the mother liquor mixed with ½ litre of water, whereupon a second crystalline fraction is obtained. The combined crystallizates are dissolved in 150 ml. of formamide, filtered with heating, mixed with 150 ml. of alcohol and 50 ml. of water and allowed to cool. The precipitate formed is filtered off. The mother liquor is mixed with 100 ml. of water and the resulting crystalline 9-nitrochryseno[5,6-d] imidazole of the formula

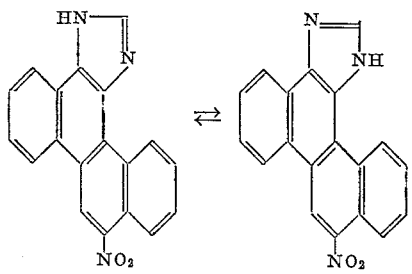

is isolated; it melts at 298° to 301° C.

EXAMPLE 3

32.0 g. of ammonium acetate are dissoved in 200 ml. of boiling glacial acetic acid and 10 ml. of 40% formaldehyde solution are added. A solution of 15.0 g. (0.05 mol) of 12-chloro-5:6-chrysenequinone in 600 ml. of glacial acetic acid is added. The reaction mixture is boiled under reflux for 2½ hours. The mixture goes first into solution, and a whitish precipitate then appears; a solution is again formed, and then a precipitate. The batch is cooled, filtered with suction, washed with glacial acetic acid, the precipitate suspended in water, again filtered with suction and dissolved in 1000 ml. of alcohol. The alcoholic solution is concentrated to yield 9-chloro-chryseno[5,6-d]imidazle of the formula melting at 260–262° C.

EXAMPLE 4

7.8 g. of 5:6-chrysenequinone (0.03 mol), 24 g. of ammonium acetate (0.3 mol) and 2.25 ml. of 40% formaldehyde solution are refluxed for 2 hours with 200 ml. of glacial acetic acid. The solution is filtered, evaporated in vacuo to half the original volume, treated with 125 ml. of water, and cooled. The resulting crystals are filtered off with suction. The crude product is recrystallized from 150 ml. of alcohol. Chryseno[5,6-d]imidazole of melting point 221–223° C. is obtained which is identical with the product described in Example 1.

EXAMPLE 5

Tablets containing 10 mg. of chryseno[5,6-d]imidazole may be prepared, for example, with the following ingredients:

| | Per tablets, mg. |
|---|---|
| Chryseno[5,6-d]imidazole | 10.0 |
| Wheat starch | 40.0 |
| Lactose | 60.0 |
| Colloidal silicic acid | 5.0 |
| Arrowroot | 15.0 |
| Talc | 9.0 |
| Magnesium stearate | 1.0 |
| | 140.0 |

Method

The chryseno[5,6-d]imidazole is mixed with a part of the wheat starch, with the lactose and colloidal silicic acid, and the mixture passed through a sieve. The remaining wheat starch is pasted with five times its quantity of water on a water bath and the powder mixture kneaded with this paste until a slightly plastic mass is formed. The plastic mass is pressed through a sieve having a mesh of about 3 mm., dried, and the dry granulate once more passed through a sieve. Arrowroot, talc and magnesium stearate are then added and the resulting mixture compressed to tablets weighing 140 mg.

What is claimed is:

1. A process for the manufacture of chryseno[5,6-d] imidazoles, wherein a member selected from the group consisting of 5:6-chrysenequinone and 12-lower alkyl-5:6-chrysenequinone is reacted with formaldehyde and ammonia in the presence of a lower alkanoic acid.

2. A process as claimed in claim 1, wherein the formaldehyde is used in the form of an agent yielding formaldehyde.

3. A process as claimed in claim 1, wherein the ammonia is used in the form of an ammonium salt.

4. A process as claimed in claim 1, wherein more than 4 mols of ammonia are used per mol of chrysenequinone.

5. A process as claimed in claim 1, wherein 6 to 20 mols of ammonia are used per mol of chrysenequinone.

6. A process as claimed in claim 3, wherein more than 4 mols of ammonium salt are used per mol of chrysenequinone.

7. A process as claimed in claim 6, wherein 6 to 20 mols of ammonium salt are used per mol of chrysenequinone.

8. A process as claimed in claim 1, wherein a member selected from the group consisting of 5:6-chrysenequinone and 12-lower alkyl-chrysenequinone is heated with formaldehyde and an excess of an ammonium lower alkanoate in a lower alkanoic acid.

9. A process as claimed in claim 8, wherein a member selected from the group consisting of 5:6-chrysenequinone and 12-lower alkyl-chrysenequinone is heated with formaldehyde and an excess of ammonium acetate in glacial acetic acid.

10. A process as claimed in claim 8, wherein more than 4 mols of the ammonium lower alkanoate are used per mol of chrysenequinone.

11. A process as claimed in claim 8, wherein 6 to 20 mols of the lower alkanoate are used per mol of chrysenequinone.

12. A process as claimed in claim 9, wherein more than 4 mols of the ammonium acetate are used per mol of chrysenequinone.

13. A process as claimed in claim 9, wherein 6 to 20 mols of ammonium acetate are used in glacial acetic acid.

14. A member selected from the group consisting of chrysene[5,6-d]imidazole and 12-lower alkyl-chrysene [5,6-d]imidazole.

15. A member selected from the group consisting of chryseno[5,6-d]imidazole, and its acid addition salts.

References Cited

FOREIGN PATENTS 1,271,986  8/1961  France.

OTHER REFERENCES

Chem. Abst., vol. 57, subject index (A–I), p. 615s (1962).

Steck et al.: Jour. Amer. Chem. Soc., vol. 65, pp. 452–6 (1943).

HENRY R. JILES, Primary Examiner

N. TROUSOF, Assistant Examiner

U.S. Cl. X.R.

260—396, 397; 424—273